United States Patent

[11] 3,618,726

[72] Inventor Eisuke Sugahara
Tokyo, Japan
[21] Appl. No. 30,873
[22] Filed Apr. 22, 1970
[45] Patented Nov. 9, 1971
[73] Assignee Nippon Piston Ring Kabushiki Kaisha
Tokyo, Japan
[32] Priority Dec. 29, 1969
[33] Japan
[31] 45/418

[54] FRICTION BRAKE OR CLUTCH ARRANGEMENT
6 Claims, 7 Drawing Figs.
[52] U.S. Cl. .................................................. 192/79,
192/88 B, 188/366
[51] Int. Cl. ........................................................ F16d 11/06,
F16d 25/04
[50] Field of Search ............................................ 192/79, 85
AT, 88 B, 107 T; 188/366

[56] References Cited
UNITED STATES PATENTS
2,710,087 6/1955 Picard ........................ 192/88 B
1,047,713 12/1912 Smith ........................... 192/88 B
2,870,891 1/1959 Eakin et al. .................. 192/88 B
3,225,877 12/1965 Gantt ........................... 192/88 B X Primary Examiner—Allan D. Herrmann
Attorney—Kelman and Berman ABSTRACT: A drum may be coupled to a wheel by means of friction shoes circumferentially distributed on the drum and mounted on carriers which may be pressed radially inward against an outer friction face of the wheel by an inflatable tube interposed between the carriers and the drum. Each carrier is guided by an axially elongated, square bar secured between two radial flanges of the drum and movably confined between radial guide walls of the carrier. The central portion of a plate spring having the shape of a wide V is mounted on each end of the bar, and the terminal spring portions engage an inner circumferential wall of the carrier to bias the friction shoe associated with the carrier away from the wheel. The springs prevent slipping engagement between the shoes and the friction face of the wheel when pressure fluid is released from the inflatable tube.

PATENTED NOV 9 1971 3,618,726
SHEET 1 OF 2
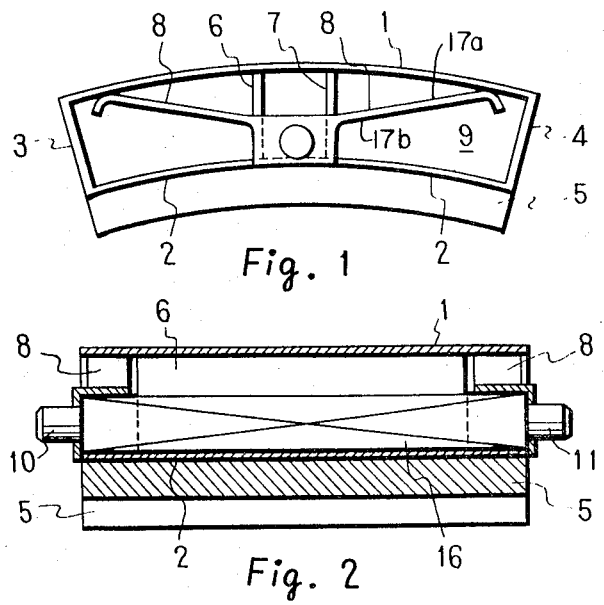
Fig. 1
Fig. 2
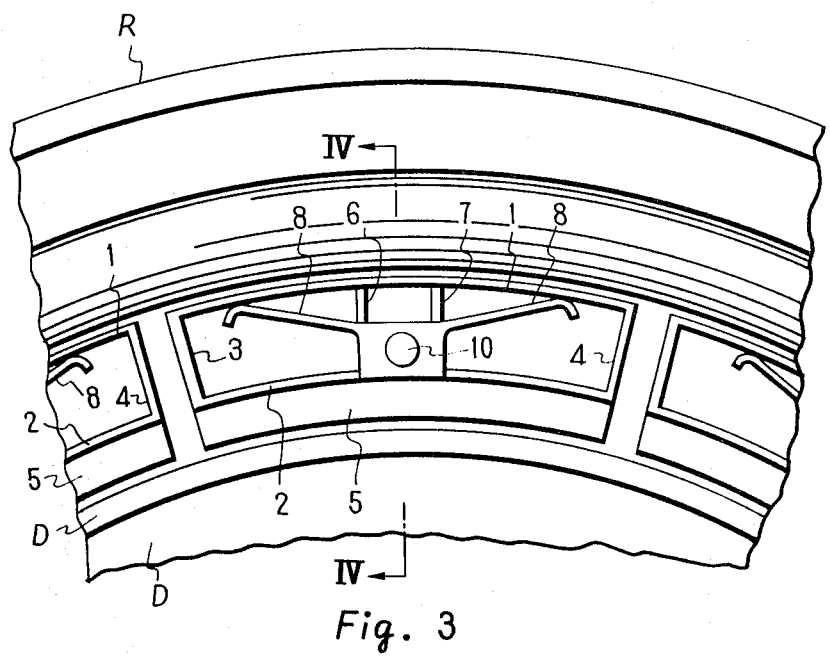
Fig. 3
INVENTOR
Eisuke Sugahara
Kelman and Berman
agents PATENTED NOV 9 1971 3,618,726
SHEET 2 OF 2
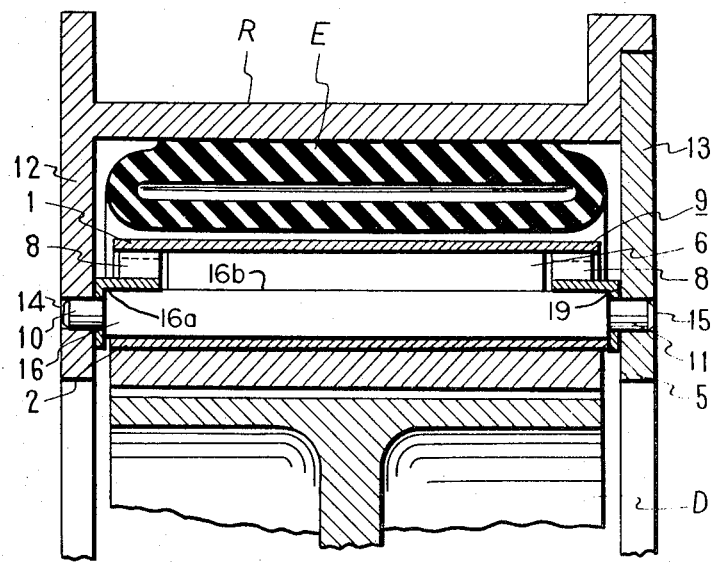
Fig. 4
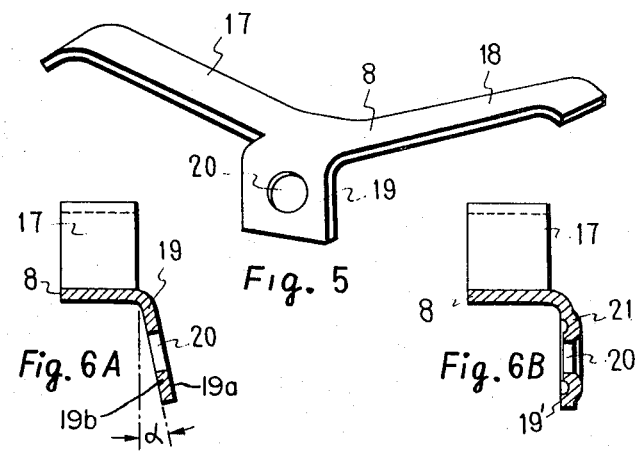
Fig. 5
Fig. 6A   Fig. 6B
INVENTOR
Eisuke Sugahara
Kelman and Berman
agents

FRICTION BRAKE OR CLUTCH ARRANGEMENT

This invention relates to friction couplings, such as friction brakes or clutches, and particularly to a mounting arrangement for friction shoes movably mounted on one coupling member for engagement with a friction face on another coupling member under the urging of a fluid-pressure operated, inflatable member.

It is known to connect two coupling members having spacedly opposite faces about a common axis by means of friction shoes mounted on one of the faces and driven into engagement with the face of the other member by an inflatable ring of resilient or at least pliable material. When it is desired to disengage the two coupling members, fluid is released from the inflatable ring, and the resiliency of its material, atmospheric pressure, or both cause the ring to contract, thereby releasing the friction shoes from the cooperating face.

If the shoes were firmly engaged with the friction face prior to release of the pressure fluid to transmit torque between the members, the shoes may seize the friction face, not be released fully when the ring is otherwise ready to contract, and slip on the friction face, thereby being heated and worn down prematurely.

An object of the invention is the provision of a brake or clutch arrangement in which the friction shoes move away from the engaged friction face as soon as the pressure in the associated inflatable ring drops below a predetermined value which may be higher than atmospheric pressure, and thereby to prevent slipping engagement between the shoes and the cooperating friction face, or to hold slipping to a minimum.

With this object and others in view, the invention provides an improved carrier for each friction shoe. The carrier has two walls which are circumferential relative to the axis of the clutch or brake and are connected in radially offset relationship to bound a casing, one of the walls being adjacent a face of the one coupling member on which the carrier is mounted, and the other wall being adjacent the friction face of the other coupling member and carrying the friction shoe or element. An elongated bearing bar is circumferentially guided in the casing for radial movement between the two aforementioned walls and partly projects from the casing. A projecting part of the bar is secured to the aforementioned one coupling member. A yieldably resilient device is interposed in the casing between the bar and the aforementioned one wall of the same in such a manner as to bias the casing radially away from the friction face of the other coupling member.

Other features, additional objects, and many of the attendant advantages of this invention will readily be appreciated as the same becomes better understood by reference to the following detailed description of a preferred embodiment when considered in connection with the appended drawing in which:

FIG. 1 shows a friction shoe and the associated carrier of the invention in front elevation;

FIG. 2 illustrates the device of FIG. 1 in side elevational section on its median plane;

FIG. 3 is a fragmentary, front elevational view of a brake or clutch of the invention including carriers as shown in FIGS. 1 and 1;

FIG. 4 illustrates the apparatus of FIG. 3 in section on the line IV—IV;

FIG. 5 is a perspective view of a spring for the carrier of FIGS. 1 and 2;

FIG. 6A shows the device of FIG. 5 in section corresponding to FIGS. 2 and 4, but on a larger scale; and FIG. 6B shows a modification of the device of FIG. 6A in a corresponding view.

Referring now to the drawing in detail, and initially to FIGS. 3 and 4, there is seen as much of an apparatus which may function as a clutch or brake as is necessary for an understanding of this invention, and the apparatus will be described initially in its operation as a clutch.

The input member of the clutch is a wheel D which is mounted as a flywheel on the output shaft of a motor in a nonillustrated manner and may be coupled to a drum or pulley R from which the torque of the motor may further be transmitted in a conventional manner, not illustrated and not directly relevant to this invention, as by a belt trained over the outer circumference of the drum R. The rim of the wheel D has a cylindrical, outer friction face which is spacedly enveloped by a coaxial, inner face of the drum R. Axially spaced, radial flanges 12, 13 extend from the inner drum face toward the axis and have each a circumferential row of openings 14, 15, the openings 14 in the flange 12 being axially aligned with respective openings 15 in the flange 13.

Cylindrical journals 10, 11 at the two longitudinal ends of an otherwise square bearing bar 16 are received in each pair of aligned openings. The bars 16 are elements of respective carriers for friction shoes 5 with which this invention is more specifically concerned. The carriers are mounted on the drum R in equiangular, circumferentially spaced relationship as is partly evident from FIG. 3.

Each carrier, individually shown in FIGS. 1 and 2, has an outer circumferential wall 1 which is cylindrically arcuate about the common axis of the drum R and of the wheel D, and a similar inner wall 2, the walls being connected in radially offset relationship by radial walls 3, 4 so that the walls 1–4 bound a casing 9. The associated bar 16 is held circumferentially centered in the casing 9 by two guide walls 6, 7 which are axially shorter than the walls 1–4 and connect the walls 1, 2 in slidable engagement with respective, opposite planar faces of the bar 16.

The bar 16 is biased toward the wall 2, and the casing 9 is thereby biased radially away from the wheel D by a pair of identical plate springs 8 shown in greater detail in FIGS. 5 and 6A. Each spring is made of an approximately T-shaped steel plate having two arms or terminal portions 17, 18 and a stem or central portion 19 which is approximately square and has a central aperture 20. The plate is bent in such a manner that the two major surfaces 19a, 19b, (FIG. 6A) of the central portion 19 extend in parallel planes intersecting the major surfaces 17a, 17b (FIG. 1) of the terminal portions 17, 18 at an angle which differs from a right angle only by a very small acute angle $\alpha$ in the relaxed condition of the spring seen in FIGS. 5 and 6A.

In the mounted condition of each spring, the aperture 20 movably receives one of the journals 10, 11 of the bearing bar 16, and the central portion 19 of the spring 8 is interposed between the associated flange 12, 13 of the drum R and the shoulder 16a of the bar 16 between the journal 10, 11 and the main central portion of the bar which is square in cross section. The portion of the spring 8 which connects the wings or terminal portions 17, 18 abuts from above on the planar top face 16b of the bar 16. The terminal portions 17, 18 extend from the central portion 19 toward the wall 1 obliquely in a common radially outward direction and in respective opposite circumferential directions, as is best seen in FIGS. 1 and 3.

The outer face of the wall 2 carries a friction shoe 5 opposite the friction face of the wheel D. A hollow ring or annular tube E of heat and oil resistant synthetic rubber is attached to the inner circumferential face of the drum R and is connected to a pump or other source of pneumatic or hydraulic fluid through a control valve in a manner known in itself and not illustrated. In the position of the apparatus shown in FIGS. 3 and 4, the ring E is vented to the atmosphere or to a sump, and is compressed by the springs 8 which bias the casings 9 radially outward against the ring. The friction shoes 5 are radially spaced from the friction face of the wheel D, and the clutch is disengaged. When the ring E is inflated with sufficient pressure, it drives the carriers radially inward against the joint restraint of the springs 8 to engage the several friction shoes 5 with the wheel D so that torque may be transmitted between the nonillustrated motor and belt. When the ring E is again deflated, the springs 8 promptly lift the shoes 5 from the wheel D and prevent slipping contact between the wheel and the shoes for any significant length of time. The shoes remain cool and wear only slowly.

The apparatus described with reference to FIGS. 1 to 6A is capable of many modifications. When the springs 8 on the bar 16 are set between the flanges 12, 13, the central portions 19 are resiliently deflected to reduce the magnitude of the angle α, as is evident from FIG. 4. The spring portion 19 abuts against the shoulder at the inner end of a journal 10, 11 and against the opposite face of the associated flange 12, 13 to keep the bar 16 in a fixed axial position between the two flanges. Some tilting movement of the journals 10, 11 in the openings 14, 15 of the flanges 12, 13 is possible to compensate for uneven inflation of the tube E or uneven wear of a shoe 5, but the bar 16 is secured against all displacement relative to the flanges.

The same result is achieved with a plate spring partly shown in FIG. 6B having a modified central portion 19' whose aperture 20 is surrounded by an annular offset portion 21 of the spring metal which functions in the manner of a cup spring to center the bar 16 between the flanges 12, 13.

Other modifications and variations will readily suggest themselves to those skilled in the art. While the illustrated apparatus has been described in its operation as a clutch capable of transmitting torque from a motor fastened to the wheel D to a load connected to the drum or pulley R, it can operate as a brake when the drum R is held stationary, and the functions of the wheel D and the drum R are interchangeable. Also, the ring E and friction shoes 5 with the associated carriers may be mounted on the wheel D instead of the drum R in a manner too obvious to require detailed description or pictorial representation.

It should be understood, therefore, that the foregoing disclosure relates only to preferred embodiments of the invention, and that it is intended to cover all changes and modifications of the example of the invention herein chosen for the purpose of the disclosure which do not constitute departures from the spirit and scope of the invention set forth in the appended claims.

What is claimed is:
1. In a brake or clutch arrangement including
   i. a first coupling member mounted for rotation about an axis and having a face extending said axis;
   ii. a second coupling member having a face extending about said axis spacedly opposite said face of said first member;
   iii. a plurality of carriers secured on one of said members against angular movement relative to said one member about said axis;
   iv. fluid-operated pressure means interposed between said face of said one member and each of said carriers for moving said carrier toward said face of the other member; and
   v. a friction element mounted on each carrier for engagement with said face of the other member upon said moving of the carriers, the improvement in each carrier which comprises:
   a. two walls circumferential relative to said axis and connected in radially offset relationship to bound a casing, one of said walls being adjacent said face of said one member and the other wall being adjacent said face of the other member and carrying friction element;
   b. an elongated bearing bar circumferentially guided in said casing for radial movement between said walls and partly projecting from said casing, a projecting part said one member and the other wall being adjacent said face of the other member and carrying said friction element;
   b. an elongated bearing bar circumferentially guided in said casing for radial movement between said walls and partly projecting from said casing, a projecting part of said bar being secured to said one member; and
   c. yieldably resilient means interposed in said casing between said bar and said one wall for biasing said casing radially away from said face of the other member,
      1. said yieldably resilient means including a plate spring having a central portion mounted on said bearing bar and two terminal portions engaging said one wall,
      2. said plate spring having two opposite major surfaces,
      3. the major surfaces of said central portion of the plate spring extending in respective parallel planes transverse to the major surfaces of said terminal portions,
      4. said central portion being apertured and receiving said bearing bar in the aperture thereof.

2. In an arrangement as set forth in claim 1, said bearing bar having a planar face extending in the direction of said movement of the bar, and said casing including a guide wall extending between said circumferential walls and slidably engaging said planar face during said movement of the bar.

3. In an arrangement as set forth in claim 2, said projecting part being secured to said one member for pivotal movement about a pivot axis parallel to said axis of said first member.

4. In an arrangement as set forth in claim 1, said terminal portions extending from said central portion toward said one wall in a radial direction and in opposite respective circumferential directions.

5. In an arrangement as set forth in claim 4, said one member being formed with a radial flange, having an opening, said part of the bearing bar being received in said opening, said bearing bar being formed with a shoulder adjacent said part thereof, and said central portion being interposed between said shoulder and said flange for longitudinally securing said bearing bar relative to said one member.

6. In an arrangement as set forth in claim 5, said central portion resiliently urging said shoulder away from said flange, respective spaced parts of said central portion abuttingly engaging said shoulder and said flange.

* * * * *